March 20, 1962 — W. C. YOCUM — 3,025,874
PRESSURE RELIEF VALVE
Filed April 25, 1960

INVENTOR.
William C. Yocum
BY
Christy, Parmelee & Strickland
his ATTORNEYS.

United States Patent Office 3,025,874
Patented Mar. 20, 1962

3,025,874
PRESSURE RELIEF VALVE
William C. Yocum, Scott Township, Allegheny County, Pa., assignor to Superior Valve and Fittings Company, Pittsburgh, Pa., a corporation of Pennsylvania
Filed Apr. 25, 1960, Ser. No. 24,289
2 Claims. (Cl. 137—540)

This invention relates to pressure relief valves or so-called safety valves, and is for a pressure relief valve designed for use specifically in mechanical refrigerators, refrigerating apparatus and other equipment where the valve must make a tight seal for long periods of time, and especially where the gases are of a nature which are difficult to confine and are likely to escape by permeating usable types of seating disk.

A relief valve, to assure tight seating, but which will open when a predetermined pressure is reached, requires a seating disk of a dense but resilient character. Materials that satisfactorily withstand certain widely used refrigerants are susceptible of damage by oil which circulates through the system, and oil-resistant materials are likely to be damaged by the refrigerant. Sometimes the relief valve is installed between the high and low sides of the system to avoid gradual leakage, but leakage even in this case is not desirable.

Certain synthetic rubber is considered to be most acceptable, but refrigerants such as that known commercially as "Refrigerant 22" and methyl chloride will permeate gradually any usable synthetic rubber. To retard loss of refrigerant through permeation of the seating disk, some manufacturers use relatively thick washer-like disks, and while this decreases migration of the refrigerant in a direction normal to the face of the disk, it increases loss by migration of refrigerant radially to the periphery of the disk. Others propose to use a thin rubber disk vulcanized to a metal disk at the outer face of the rubber disk, but it is expensive to secure a bond between the metal and rubber that will not separate when gas pressure builds up at the interface of the rubber and metal, and involves other difficulties of a technical nature.

The permeation of the gas through the disk gives rise to a second difficulty. Relief valves are spring-biased or loaded to remain closed until pressure in the system reaches a certain critical figure per unit of area. It has been found that the valves in service may open before this critical figure is reached, even though the spring has been carefully calibrated, and the valve under test behaved perfectly. I have discovered that refrigerant, permeating through the disk, is trapped between the disk and the cup in which it is carried. The disk is of larger diameter than the raised valve seat with which it seals. While the central area of the disk is subject to the high pressure of the system, the periphery of the disk is exposed to atmospheric pressure, or, where the relief valve is between the high and low sides of the system, to less than atmospheric pressure. The trapped gas between the disk, and the cup in which it is carried, thus tends to force the periphery of the disk downwardly where there is no opposing pressure to resist it. This causes the disk to become slightly concave on the face which engages the raised seat of the valve. Such concavity tends to move the circle of contact between the disk and the seat radially outward, thereby slightly increasing the area of the disk which is exposed to high pressure. The spring, having been set to resist pressure on a smaller area, is now insufficient, and the valve opens at a pressure below that for which it was set.

The present commercial practice of guaranteeing a refrigerator for five years, instead of the former one-year guarantee, means that slow leakage, which at one time could be tolerated, is now too great to be acceptable.

The present invention has for its object to provide a valve in which the loss of refrigerant by migration through the rubber is reduced to a minimum. A further object of the invention is to preclude the disk from assuming a convex shape, even if there is some migration of the gas between the disk and the cup.

A further object of my invention is to achieve these results by simple, inexpensive expedients.

My invention may be more fully explained in conjunction with the accompanying drawings, in which.

Figure 1:
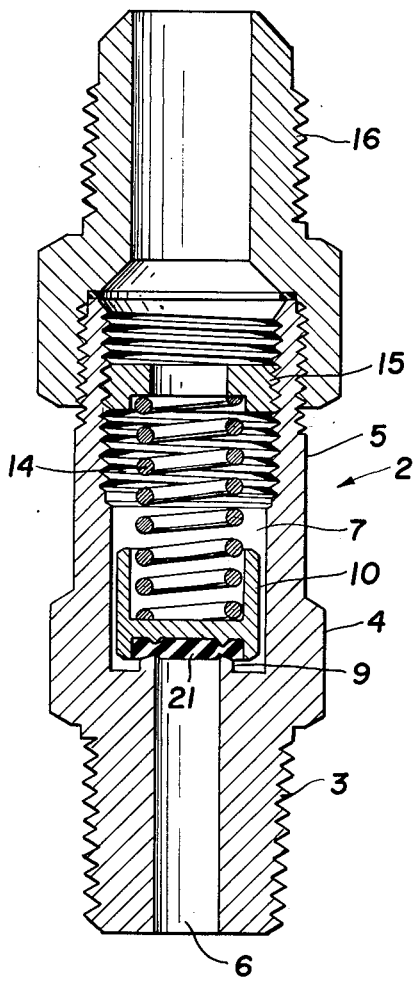
FIG. 1 is a vertical section through a relief valve embodying my invention.
Figure 2:
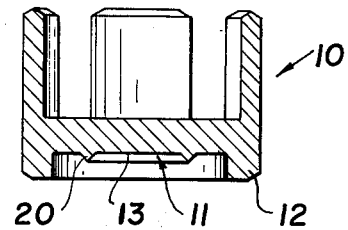
FIG. 2 is an enlarged vertical section through the disk or seat holder of the valve with the disk removed.

Referring to the drawings, 2 designates generally the valve body having a nipple 3 for connecting it into the pressure side of a refrigerating system. It has a hex portion 4 to which a wrench may be applied, and a valve and spring housing portion 5 extending upwardly from the hex portion in the position shown in FIG. 1. There is an axial gas passage 6 extending up through the nipple and into the hex or nut portion. There is a counter-sunk well or opening 7 of larger diameter extending downwardly from the upper end of the body. The passage 6 opens into this well or opening 7, and there is a raised seat 9 around the passage 6 where it opens into the recess. As better shown in FIG. 4, this raised seat is not flat on its top surface, but is slightly inclined upwardly and inwardly to provide an edge or line contact with the seating disk to be described.

Slidably fitted inside the recess 7 above the raised seat is a seating disk holder, designated generally as 10. It has a disk portion 11 surrounded by a downwardly-extending peripheral flange 12 so that the lower face of the disk is recessed. The diameter of the flange 12 is substantially greater than the diameter of the raised seat. The lower recessed face of the disk is designated 13. The upwardly-extending sides of the holder are castellated to reduce weight and still provide adequate guiding surface against the inner walls of the recess to keep the seating disk holder from cocking or binding.

There is a compression spring 14 having its lower end received in the top of the seating disk holder. Its upper end is confined against a collar 15 screwed into the upper end of the body. The inside of the upper end of the body is internally threaded to accept the collar. When the collar has been screwed down to apply the required compression of the spring, it is customary to peen the threads on the inside of the body above the collar sufficiently to prevent the collar from backing out under vibration or changes of temperature or other causes that might tend to unscrew it accidentally.

The valve body is here shown with a separate nipple 16 screwed onto its exteriorly-threaded upper end, so that, if desired, this nipple may be connected to a pipe leading to the low pressure side of a compressor, or to a suitably located vent.

The structure as described is now old in the art, except that some manufacturers provide a central opening through the part 13 of the seating disk-holding member. This is not desirable with the present invention, and the area 13 should be imperforate.

According to this invention there is provided a raised ridge 20 on the underside of the face area 13 which is of V shape. It is concentric with flange 12 and with the raised seat, and its edge is over the seat.

Tightly fitted in the lower recessed face of the seating disk holder is the rubber seat or disk 21. As above stated, refrigerants of the class described can very slowly permeate through it at the pressures encountered in the system, but it can only do so if the rubber, which is synthetic rubber to resist the action of oil, can swell. Since the spring exerts a heavy pressure—perhaps sufficient to resist a gas pressure on the under surface of the valve disk of 250 pounds per square inch—against the seating disk holder, this pressure is localized between the sharp line or edge contact made by the ridge 20 and the high edge of the raised seat. This tends to substantially prevent the swelling of the rubber enough for gas to permeate through it, so that the escape of gas in a radial direction is very substantially prevented, and even if the refrigerant permeates vertically through the disk it has little chance to escape because of the seal which is effected where the ridge 20 sinks into the resilient disk 21.

Figure 4:
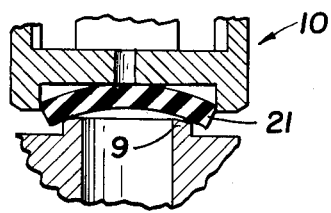
FIG. 4 is an exaggerated schematic view of a conventional form of valve illustrating the effect of concavity of the seating disk in causing the valve to release at a pressure below that for which it is supposed to release.

It will be observed that the rubber disk 21 is of greater diameter than the seat, so that its peripheral margin is not subject to the high pressure to which the central area of the seat is exposed. Consequently, if there should be any permeation of gas radially back of the disk, it would tend, as shown in FIG. 4, to bow the edges of the disk down. This action in the usual valve shifts the line of contact between the raised seat from the high inner edge to the lower outer edge, as shown in FIG. 4. The result is that the area of the disk exposed to high pressure gas is increased, and the spring pressure which was originally set at the correct value for the area initially exposed, is not now great enough to hold the valve closed against full operating pressure in the system, and the valve opens, venting the refrigerant, or causing the pump to run continuously where the valve has its outlet connected to the low pressure side of the system.

Figure 3:
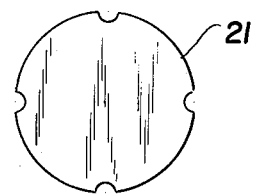
FIG. 3 is a plan view of a disk.

The present invention avoids this difficulty by relieving the pressure under the marginal periphery of the disk. This may be done simply by one or more suitably located vents for bleeding away any gas from between the peripheral area of the seating disk and the holder. In FIG. 3 I have shown the disk having one or more notches in its periphery through which any such gas pressure can be relieved, but the notches do not interfere with the tight, snug contact which is needed between the seat and its holder, should the valve chatter. Small holes could be used as vents or an irregular or non-circular peripheral shape for the disk would serve, or a hole or holes could be provided through the holder at this particular location at the very periphery of the disk.

While I have shown and described one specific form of valve and its application to refrigerating systems, the invention is not restricted to the exact form shown and is applicable to any fluid pressure system when a relief valve subject to similar conditions is required.

I claim:

1. A relief valve having a body with a passage therethrough, the passage having an inlet portion open to the pressure side of a fluid pressure system in which the valve is used and which is to be protected thereby and an outlet portion, the outlet portion being of larger diameter than the inlet portion where the two portions join, a raised annular valve seat in the valve body where the inlet portion and the outlet portion of the passage come together, a valve disk holder in the outlet portion movable toward and away from the raised seat, said holder having a recessed face formed by a surrounding flange on that surface which confronts the seat, the diameter of the recessed face within said flange being greater than the outside diameter of the said seat, an annular ridge on the said recessed face directly opposite the raised seat, said ridge having a sharp edge directed toward the raised seat, a spring for urging that valve disk holder toward the seat, and a valve disk of resilient material on the recessed face of the holder, said disk being compressed on both faces between the raised seat and the annular ridge by the pressure of the spring acting against the disk holder, the area of the valve disk holder within the confines of the annular ridge being imperforate.

2. A relief valve having a body with a passage therethrough, the passage having an inlet portion open to the pressure side of a fluid pressure system in which the valve is used and which is to be protected thereby and an outlet portion, the outlet portion being of larger diameter than the inlet portion where the two portions join, a raised annular valve seat in the valve body where the inlet portion and the outlet portion of the passage come together, a valve disk holder in the outlet portion movable toward and away from the raised seat, said holder having a recessed face formed by a surrounding flange on that surface which confronts the seat, an annular ridge on the recessed face directly opposite the raised seat, said ridge having a sharp edge confronting the raised seat, a spring for urging the valve disk holder toward the seat, and a valve disk of resilient material extending over the recessed face of the holder and retained in place by friction with the marginal flange of the holder, the disk being initially spaced from the recessed face of the holder by said annular ridge, the area of the recessed surface of the holder surrounded by the ridge being imperforate, said disk being compressed on both faces between the raised seat and the annular ridge by the pressure of the spring acting against the disk holder, the edges of the valve disk beyond the diameter of the valve seat being notched to equalize pressures on opposite faces of the margin only of the disk.

References Cited in the file of this patent

UNITED STATES PATENTS

| | | |
|---|---|---|
| 2,254,209 | Buttner | Sept. 2, 1941 |
| 2,670,759 | St. Clair | Mar. 2, 1954 |

FOREIGN PATENTS

| | | |
|---|---|---|
| 535,918 | Canada | Jan. 15, 1957 |